US009324095B2

(12) United States Patent
Singleton et al.

(10) Patent No.: US 9,324,095 B2
(45) Date of Patent: Apr. 26, 2016

(54) DETERMINING CONVERSION RATES FOR ON-LINE PURCHASES

(75) Inventors: David P. Singleton, San Francisco, CA (US); Miles E. Barr, London (GB)

(73) Assignee: Google Inc., Mountain View, CA (US)

(*) Notice: Subject to any disclaimer, the term of this patent is extended or adjusted under 35 U.S.C. 154(b) by 17 days.

(21) Appl. No.: 13/702,888

(22) PCT Filed: Jun. 8, 2011

(86) PCT No.: PCT/US2011/039687
§ 371 (c)(1),
(2), (4) Date: Dec. 7, 2012

(87) PCT Pub. No.: WO2011/156532
PCT Pub. Date: Dec. 15, 2011

(65) Prior Publication Data
US 2013/0085841 A1    Apr. 4, 2013

Related U.S. Application Data

(60) Provisional application No. 61/352,664, filed on Jun. 8, 2010.

(51) Int. Cl.
*G06Q 30/02*    (2012.01)
*H04L 29/06*    (2006.01)

(52) U.S. Cl.
CPC ............ *G06Q 30/0246* (2013.01); *G06Q 30/02* (2013.01); *H04L 63/0876* (2013.01)

(58) Field of Classification Search
CPC .................... H04L 63/0876; G06Q 30/0242

USPC ............................ 705/14.41, 14.45
See application file for complete search history.

(56) References Cited

U.S. PATENT DOCUMENTS

| | | | |
|---|---|---|---|
| 7,853,533 B2* | 12/2010 | Eisen | 705/64 |
| 8,125,907 B2* | 2/2012 | Averi et al. | 370/232 |
| 8,706,551 B2* | 4/2014 | Roetter | G06Q 30/02 705/14.41 |
| 9,129,097 B2* | 9/2015 | Etchegoyen | G06F 21/10 |
| 2005/0273388 A1 | 12/2005 | Roetter | |
| 2007/0136573 A1* | 6/2007 | Steinberg | 713/155 |
| 2007/0260736 A1 | 11/2007 | Miller | |
| 2008/0250448 A1 | 10/2008 | Rowe et al. | |
| 2009/0099904 A1 | 4/2009 | Affeld et al. | |
| 2009/0144146 A1* | 6/2009 | Levine et al. | 705/14 |

OTHER PUBLICATIONS

Wikipedia article, Device Fingerprint (May 19, 2009 rev.).*
(Continued)

*Primary Examiner* — Namrata Boveja
*Assistant Examiner* — Shawn Lillemo
(74) *Attorney, Agent, or Firm* — Fish & Richardson P.C.

(57) ABSTRACT

Identifying on-line advertising conversions includes identifying, at a computer server system, a plurality of reports from one or more computing devices, wherein each of the reports indicates a clock skew between one of the computing devices and a clock server system; using the clock skews to determine that two or more of the reports are likely from a common computing device; determining that the two or more of the reports are common, in that they correspond to display of an advertisement on the common computing device and to purchase of on-line content with the common computing device; and indicating that a purchase conversion occurred based on determining that the two or more of the reports are common.

14 Claims, 6 Drawing Sheets

(56) References Cited

OTHER PUBLICATIONS

Wikipedia article, Clock Skew (Jan. 5, 2009 rev.).*
Timothy J. Salo, Multi-Factor Fingerprints for Personal Computer Hardware (IEEE 2007).*
Tadayoshi Kohno, Andre Briodo, and K.C. Claffy, Remote Physical Device Fingerprinting (IEEE Computer Society Press 2005).*
David L. Mills, Internet Time Synchronization: The Network Time Protocol, 39:10 IEEE Transactions on Communications 1482 (Oct. 1991).*
International Search Report and Written Opinion in International Application No. PCT/US2011/039687, dated Nov. 30, 2011, 11 pages.
International Preliminary Report on Patentability in International Application No. PCT/US2011/039687, mailed Dec. 20, 2012, 7 pages.
Peter Eckersley "A Primer on Information Theory and Privacy" [online] [retrieved on Jun. 6, 2011] Retrieved from the Internet: https://www.eff.org/deeplinks/2010/01/primer-informaton-theory-and-privacy (Jan. 27, 2010) 2 pages.

* cited by examiner

DETERMINING CONVERSION RATES FOR ON-LINE PURCHASES

CROSS-REFERENCE TO RELATED APPLICATION

This application is a National Stage Application under 35 U.S.C. §371 and claims the benefit of International Application No. PCT/US2011/039687, filed Jun. 8, 2011, which claims priority to U.S. Provisional Application No. 61/352,664, filed Jun. 8, 2010. These applications are hereby incorporated by reference in their entirety.

TECHNICAL FIELD

This document relates to identifying when users of computing devices that perform a first action on-line also perform a second action on-line.

BACKGROUND

People interact more and more with computers, and they also interact more and more with different kinds of computers. While desktop and laptop computers may have been the most prevalent computers in people's lives in the past, more people now use mobile computers such as in the form of smart phones, and frequently use them without even thinking of them as being computers.

Users of mobile devices are now able to leave their other computers behind and to interact entirely on-line using their mobile computing devices. For example, music may be purchased on-line from music stores, and software applications can be purchased from application marketplaces. Both can then be downloaded and accessed immediately from the user's mobile device.

Developers of such electronic content, like sellers of any product, often prefer to advertise the content so as to make users aware of it and facilitate sales. Thus, they may run advertisements in various forms, where selecting the advertisement takes a user to a store where the user can buy the electronic content. Such developers may want to know when an ad is successful in creating a conversion (i.e., a purchase of content), or may want to pay for the ad only when it is successful in creating a conversion. However, there can be difficulties in determining how a user reacts to an ad when, in response to selecting the ad, the user is taken to a content store that is operated by an organization that is different than the organization that served the ad. In some circumstances, an IP address for a user may be checked, but wireless carriers often cause many different users to show the same IP address.

SUMMARY

This document discusses systems and techniques by which conversions resulting from ad impressions may be determined. Specifically, when a user selects an ad, an identifier that is personal to their computing device may be generated and reported to a central server system. The user's subsequent downloading of content promoted in the ad may cause a subsequent report to be made to the central server system. The reports may be maintained in logs, and the central server system may periodically scan the log for instances of ad-content reporting matches, where an identifier from a report generated from the selection of an ad matches an identifier from a report generated from content related to the ad being subsequently downloaded. When such matches are found, the system may assume that a conversion occurred—i.e., that the user was motivated to purchase the content based on being presented with the ad.

In one example, purchases of on-line software applications (or apps) may be tracked using a value of clock skew between mobile devices and a clock server as the device-specific metric. Specifically, when a user clicks on an ad for an app, JavaScript or other code associated with the ad may cause the user's device to ping a clock server and then compare a time returned by the clock server with its own clock time to compute the skew value between the two times. The device may then report such a skew value to a central service while it is being redirected to an application marketplace. If the user purchases the app, the code for the application may have code included in it that is similar to the JavaScript code—i.e., so that when the application is installed and executed, it may ping the same clock server, compute a skew, and report the skew. The central server system may later identify the two entries as being related by looking for matching skews in matching transactions (e.g., an ad for product X and a purchase of the same product X). The central server system may then cause the transaction to be reported to the advertiser, and/or cause a certain currency amount to be automatically deducted from the advertiser's account by agreement with the advertiser.

In certain implementations, the techniques discussed here may provide one or more advantages. For example, ad conversions and ad conversion rates may be tracked even where the conversion process passes through a third-party web site or application, where a unique identifier cannot be propagated from the ad impression. Also, sellers of on-line content like apps, music, and e-books, can be provided with a billing option that more closely tracks the benefits they receive from running an ad, and can also be provided with analytics data that lets them better see where ads have been effective in creating purchases. Such sellers may then use the information to change their ads, to change where and when they run the ads, or to make various other changes to their promotional campaigns.

In one implementation, a computer-implemented method for identifying on-line advertising conversion is disclosed. The method comprises identifying, at a computer server system, a plurality of reports from one or more computing devices, wherein each of the reporting instances indicates a clock skew between one of the computing devices and a clock server system. The method also includes using the clock skews to determine that two or more of the reporting instances are likely from a common computing device, and determining that the two or more of the reporting instances are common, in that they correspond to display of an advertisement on the common computing device and to purchase of on-line content with the common computing device. The method further includes indicating that a purchase conversion occurred based on determining that the two or more of the reporting instances are common.

In some instances, the method further comprises serving code for a web advertisement to a computing device that causes a clock skew for the computing device to be determined as a result of a user of the computing device interacting with the web advertisement. The method can also comprise receiving a skew reporting instance from the computing device and storing information identifying the advertisement and clock skew for the computing device in a reporting log. The clock skews can be determined by sending a time request from a requesting computing device to a target computing device, and using a time received form the target computer to determine a clock skew. Also, the clock skews can be determined by subtracting the time received from the target computing device from a current time on the requesting computing device, and using one-half of a round-trip time period for the time request. The requesting computing device can be a client computing device and the target computing device can be a part of the computer server system.

In some instances, using the clock skews to determine that two or more of the reporting instances are likely from a common computing device comprises determining that a clock skew for a first reporting instance is within a predefined range of a clock skew for a second reporting instance. Also, using the clock skews to determine that two or more of the reporting instances are likely from a common computing device can comprise ordering the plurality of reporting instances according to level of clock skew. Moreover, determining that the two or more of the reporting instances are common can comprise examining reports of displayed advertisements and converted purchase transactions for matches from groups of reports that are identified as having been received within a threshold amount of time (e.g., 1 minute, 5 minutes, 20 minutes, one hour, one day) of each other. Such a threshold amount of time can be based on an amount of time for a user select an advertisement, download a corresponding application promoted in the advertisement, install the downloaded application, and run the application.

In another implementation, a computer-implemented system for identifying on-line advertising conversions is disclosed. The system comprises an advertising sub-system arranged to serve interactive advertisements to users of computing devices; one or more transaction logs that store transaction instance data representing interactions by computer users with the advertisements and activities involving products that are related to (e.g., that are the subjects of) the advertisements; and a conversion correlator programmed to correlate connections between interactions with advertisements with interactions with products that are subjects of the advertisements by matching clock skew data for the computing devices. The interactive advertisements can be served with code that cause interaction with the advertisements to result in a clock skew being computed for a device on which an advertisement has been displayed, and being reported to the one or more transaction logs.

In addition, the system can include an application marketplace offering one or more applications for sale that, when installed on a computing device, cause a clock skew for a device on which the application is installed to be reported to the one or more transaction logs. The system can also include a transaction log manager programmed to remove entries from the logs after the conversion correlator has analyzed the entries.

The details of one or more embodiments are set forth in the accompanying drawings and the description below. Other features and advantages will be apparent from the description and drawings, and from the claims.

DETAILED DESCRIPTION

This document describes systems and related techniques for tracking advertising conversions for electronic content. In general the techniques described here involve tracking a derived device specific metric value and reporting that metric value along with other information about a device when a user of the device views or interacts with an advertisement. The techniques also involve tracking the metric value after the user of the device has been identified as performing a purchase or similar transaction relating to the advertisement. For example, a clock skew between the device and a server system may be computed both when a user of the device selects an advertisement for a piece of electronic content, and after the user purchases the electronic content. Because various different devices have varying clock skews, such a metric may be used along with other identifiers to help uniquely identify the device and to differentiate the device from other devices whose users have reacted to the ad or purchased the content. Such techniques involving clock skew and other less specific identification factors have been shown to provide a high confidence level for the tracking and matching of ad impressions and selections to conversions, such as purchases of web apps.

Figure 1A:
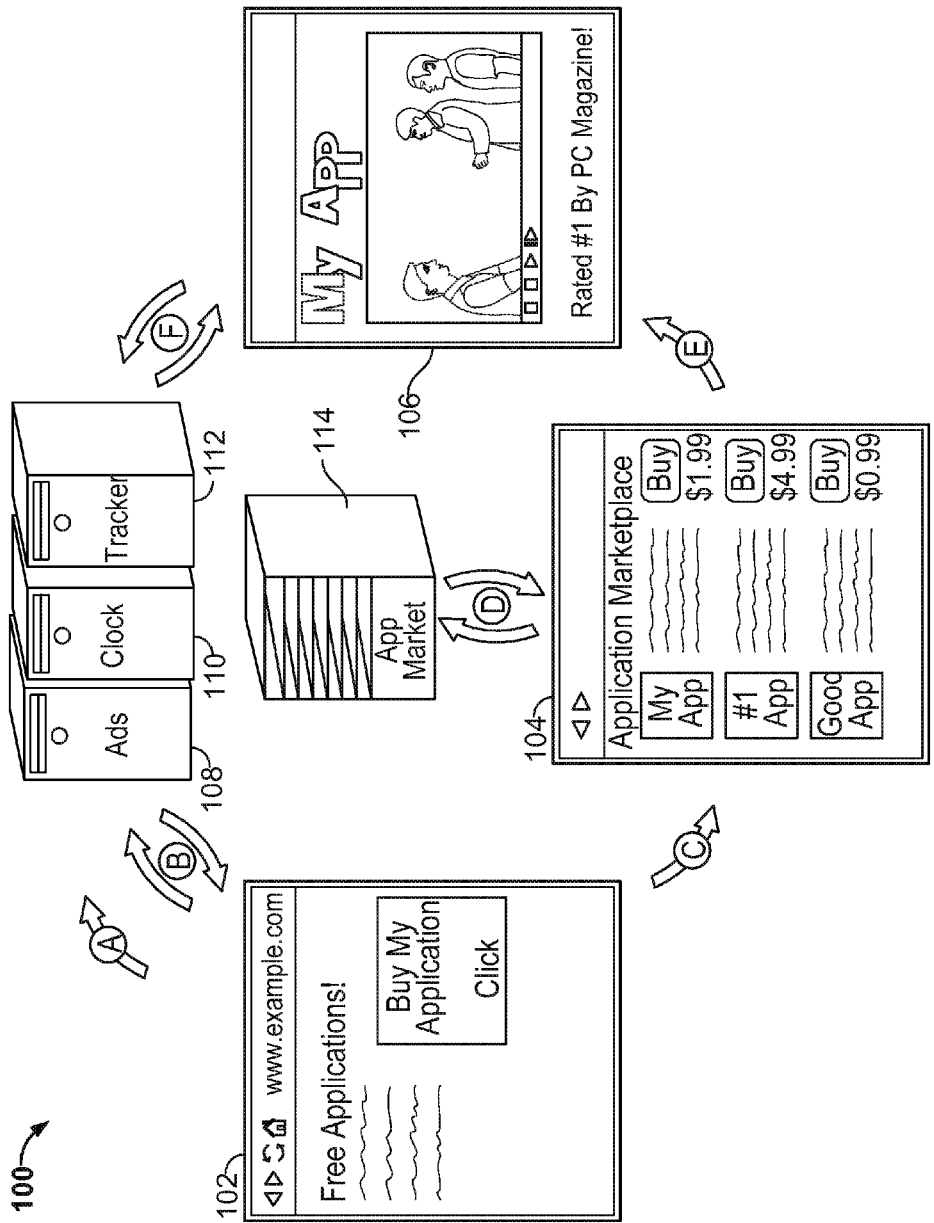
FIG. 1A is a diagram showing the tracking of conversions resulting from electronic advertisements for applications.

FIG. 1A is a conceptual diagram showing the tracking of conversions for electronic advertisements for applications. In general, the figure shows various server systems, and a timeline of user interactions with those server systems, as part of a purchasing transaction for a user of a computing device such as a smartphone. The transaction in this example relates to a software application that is offered in an application marketplace for mobile telephones.

The process 100 depicted in FIG. 1A begins with an advertising page 102, which may simply be a standard HTML webpage containing content and advertisements that have been served with the page in a familiar manner. In particular, the web page may relate to reviews of new web apps, and the advertisement may be an advertisement for a particular new application that a publisher would like interested users to purchase and download. The advertisement may have been served by an ad server 108 in a familiar manner, such as by having the advertisement submitted by an advertiser along with keywords, carrying out an auction so as to determine whether to display the advertisement, and/or serving the advertisement to the user in combination with the page 102, which may be a page published by organization other than the organization that runs the ads server 108.

The advertisement may include one or more selectable areas that a user may select to be taken to a landing page associated with the advertisement in a familiar manner. For example, selection of the advertisement may take the user to a webpage for the company that developed the particular web app. Alternatively, selection of the advertisement may cause the user's smart phone to be redirected to a third-party application marketplace, which may sell a variety of applications, and where the redirecting may take the user to a particular part of the application marketplace that sells the advertised web app.

The user's selection of the advertisement is indicated in the figure by Arrow A, which causes the user's smart phone to be redirected from the advertising page 102 to a store page 104, which is served by application marketplace server 114 in a familiar manner (as indicated by Arrow D). The transition of the user's smart phone display is indicated by Arrow C. Before the redirection of the user's browser to the store page 104, a transaction occurs using code, such as JavaScript code, that is associated with the advertising page 102. Such an interaction is indicated by the arrows labeled B. In general, the interaction involves the code causing the smart phone to ping a clock server 110 to obtain a time that is indicated by that clock server 110. The clock server 110 may simply be a server that is made available for providing such time in response to requests received from a variety of users, services, applications, and other items and objects. The clock server 110 may respond via a message that indicates its time when the ping was received, and the smart phone may determine the difference between its clock and the clock of the clock server 110, which may be referred to as clock skew. For example, the device may subtract the two times and take into account one half of the round-trip time (RTT) for the transaction.

Figure 1B:
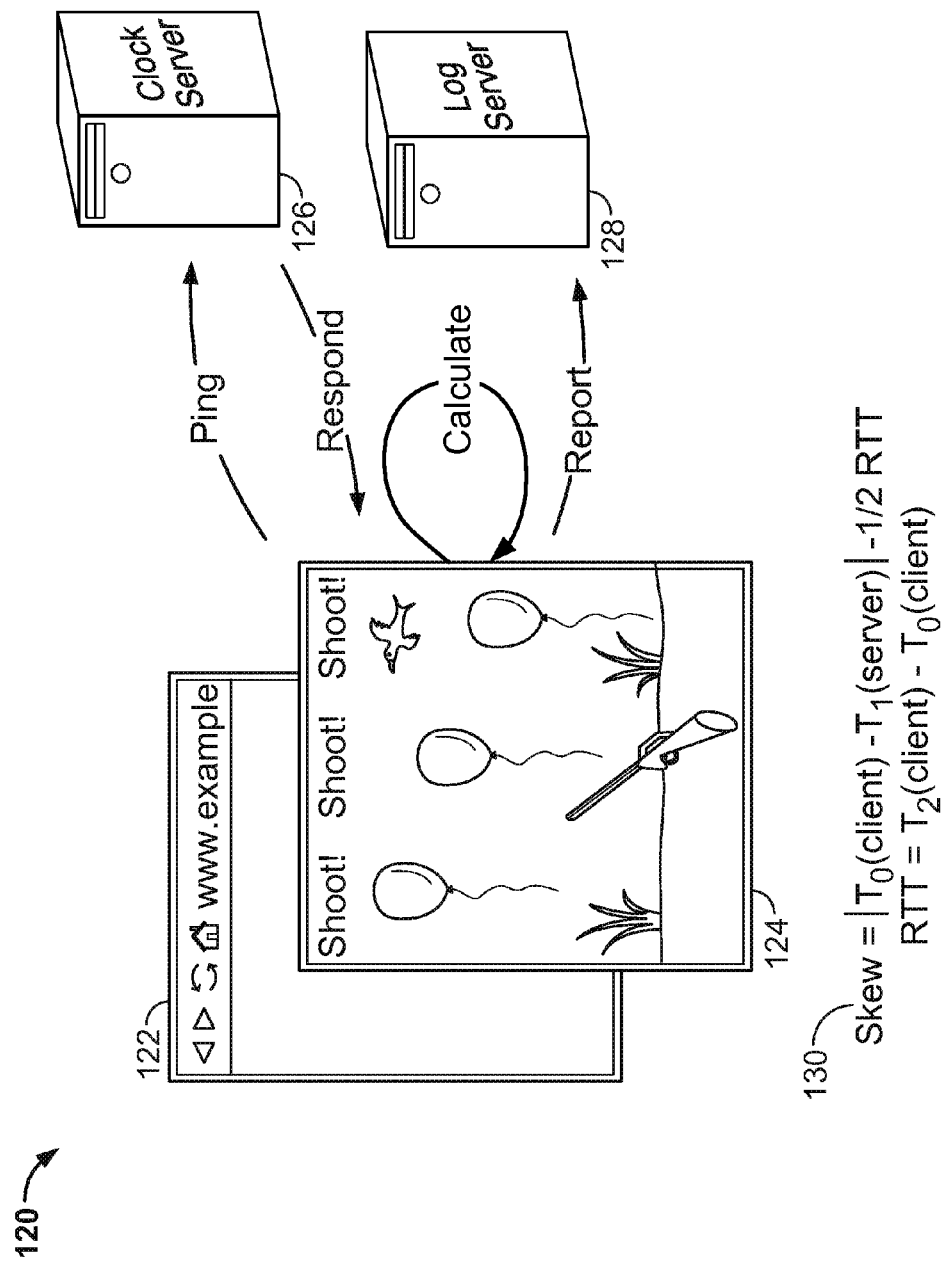
FIG. 1B is a diagram showing a technique for determining and reporting clock skew for tracking of advertisement conversions.

A particular technique for making such a determination is shown in FIG. 1B and described in detail here. As shown in FIG. 1B, a system 120 for determining a clock skew may be made up of one or more applications 122, 124 that communicate with one or more servers 126, 128. The applications 122, 124 in this example include a browser 122 that is executing markup code and other similar code such as JavaScript code. The applications 122, 124 may also include a native application 124 that has been installed on a mobile computing device.

The servers in this example include two different servers that have particular roles in tracking user reaction to advertisements. A clock server 126 may be of a generic form of server that receives requests for clock time and that responds in a preformatted way with an indication of the current time for the clock server 126. The clock server 126 may be one of a group of servers that are maintained by an organization so as to have synchronized baseline time so that other services or clients may make determinations using such baseline time. A log server 128 keeps track of events that may occur within an advertising system. In this example, the log server 128 maintains records that each indicate that a particular user interaction that is relevant to an advertising system has occurred. Such records may include records indicating that particular advertisements have been served in particular situations, that users have reacted to the advertisements in particular ways such as clicking on one or more portions of the advertisements, and other similar information.

A series of interactions are shown between the applications 122, 124 and the servers 126, 128 to indicate a process for determining and reporting clock skew between the device and the clock server 126. For example, in a first action, one of the applications 122, 124 pings the clock server 126 according to an application programming interface (API) that has been published for the clock server 126. The clock server 126 then responds by immediately returning data that represents the time on the clock when the ping was received. The code for the particular application that calculates a clock skew then reports the calculated skew to the log server 128. The report that is logged by the log server 128 may include additional information, such as information that indicates a device type for the remote device, a manufacturer or model of the device, an IP address of the device, information indicating settings for the device such as a native spoken language for the device, and other similar information that may be obtained to help identify information about the device.

Calculation 130 indicates how a client device that is executing one of the applications 122, 124 may calculate skew between it and the clock server. In particular, the device may record and store its own clock time when it sends the ping, and its clock time when it receives a response from the clock server. The difference between those two times represents the total round-trip time for the communication. If one assumes that the round-trip time is symmetrical, which has been found to be a sufficient assumption in this sort of application, the clock skew is the difference between the clock server 126 time and the time on the client clock at the midpoint of the round-trip (which is the midpoint of the two times recorded by the client). Thus, the calculation 130 involves identifying such a time as being the clock skew that is relevant here.

Referring now back to FIG. 1A, the interaction shown by Arrows B has occurred. As described in this example, the skew has been reported to tracker server 112, which maintains logs of advertising-related activity, and the user is interacting with the marketplace server 114 to determine whether to purchase the web application, and to carry out the purchase transaction if the user has determined that he or she should purchase the application. When the user does purchase the particular application, then installs and executes the application 106, as shown in the progression by Arrow E.

Code that is embedded in the application 106 may be programmed to carry out a transaction, as indicated by Arrow F, for determining and reporting clock skew like the transaction that was previously carried out by code associated with advertising page 102. Alternatively, when particular applications are installed on a device, the device may include a separate application which may be part of the operating system, and which may report activation of the applications to a server system such as tracker server 112, and may include clock skew as one such reported parameter when it does so.

Thus, by this process, a device has reported its clock skew to tracker server 112 in two different contexts: when a user has responded to an advertisement (as indicated by Arrow B), and when a user has installed a piece of software or other content that is related to that advertisement (as indicated by Arrow F). As described in more detail below, the two entries may be identified as being related to each other and as coming from the same device, by determining that their clock skews match or substantially match, since different devices are likely to have much more different clocks skews than would a single device over a period of several minutes or a small number of hours that would elapse between a user's interaction with an advertisement and the user's installation of an application associated with the advertisement.

Although the example discussed here has been identified as involving the purchase of a native application discovered via a web page, the techniques described here could be used for other forms of online content. For example, a music playing application could be programmed to report clock skew and the identity of a song when that song is first played. Such information could then be matched to stored information about earlier interactions relative to the song. For example, a user may have selected an advertisement relating to the song and been taken to an online music store—where the user purchased the song as a result of the advertisement. Alternatively, the user may have been listening to an Internet radio station and heard the song, and then selected a link provided by the radio station so as to be taken to an online music store and purchased the song.

Also, although the example above is provided with respect to a device-specific metric value in the form of clock skew relative to a server, other device-specific metrics that have been determined to be accurate indicators of one device as compared to other devices may be used. For example, environmental indicators for the area around a device may be used, such as sound or temperature of the device. Also, location data for a device may be used, such as determined by GPS data from the device, or as estimated by a cell tower or other access point through which the device communicates. Such device specific-indicators are determined to be insufficient on their own to distinguish the device from other devices that may be included in a combined metric for distinguishing devices, such as with factors that include IP address for a device, model of a device, operating system and version of operating system on the device, and other similar factors. Alternatively, one or more of the additional factors may be taken into account along with the primary, device-specific identifier.

Figure 2:
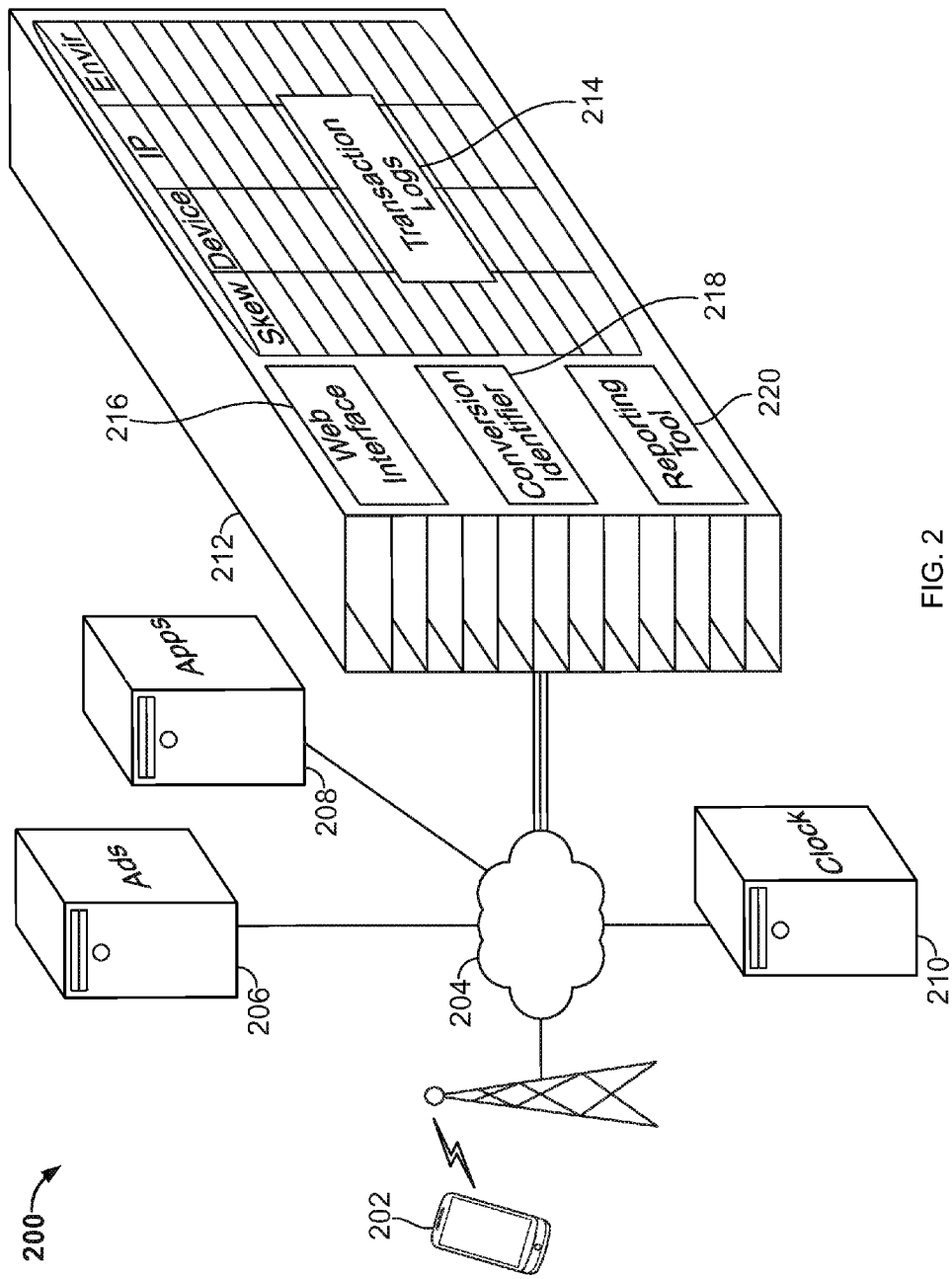
FIG. 2 is a schematic diagram of a system for tracking conversions.

FIG. 2 is a schematic diagram of a system 200 for tracking conversions. In general, the system includes a number of computer servers configured to communicate with client computing devices such as computing device 202, and the description here focuses on a tracking server 212 and components in the tracking server 212 that may be used to identify conversions by users after they have been shown ads for various products such as applications and other online content.

As indicated, the system 200 centers around a network 204, such as the Internet, through which a number of computing devices may communicate. A central device in the system 200 is mobile computing device 202, which may take the form of a smartphone in a familiar configuration, and may be used by a variety of users to access online content. Such accessing may involve, for example, surfing of the World Wide Web, where a user may choose to review particular websites that are relevant to their particular interests, such as sports or technology websites. An advertising server system 206 may be employed to incorporate advertisements into the display of those various webpages, where the advertisements are selected to be particularly relevant to the users of the webpages. For example, for a sports website, an advertisement for a fantasy football application may be displayed by the advertising server system 206. As explained above, a user may click on the displayed advertisement to be taken to an application marketplace that is provided by an application marketplace server system 208. As also indicated above, the device 202 may, upon the user selecting the advertisement, communicate with clock server 210 in order to identify a clock skew between the device 202 and the clock server 210.

Such a clock skew may be reported to the tracking server system 212, and may be logged in transaction logs 214. The communication may be received by a web interface 216, which may include a web server and other appropriate interface structures. The web interface 216 may reformat the received data for inclusion in the transaction logs 214, and may also add additional metadata for storage in the transaction logs. For example, the web interface 216 may identify an IP address associated with the device 202 and received in the communication. The web interface 216 may also identify additional data such as cookie data for the device 202 and other data that is available for better identifying the device 202 (though in many implementations, the techniques discussed above and below do not rely on cookie data in any manner). The tracking server 212 may be programmed in such a manner that appropriate privacy for a user of the device 202 is maintained, and the user of the device 202 may be enabled to adjust what information will be shared by the device 202 in order to maintain such privacy.

Such other information that may be logged by the tracking server 212 is shown in additional columns of the transaction logs 214. For example, one column in the example logs includes a device identifier, which may be an alphanumeric representation of a device model and type, an operating model and version, and other information such as a list of applications that have been loaded on the device. A fourth column in the transaction logs 214 represents current environmental variables for the device, such as noise and temperature around the device at the time that a particular submission was made by the device 202 to the tracking server 212. Other information about a context around the device may also be stored.

At certain periodic intervals, such as once each day, the tracking server 212 may analyze the data in the transaction logs 214 to determine information such as whether particular users have responded positively to advertisements served to them by purchasing content to which the advertisements were directed. Such an analysis may be conducted by a conversion identifier 218. The conversion identifier 218 may be programmed to identify parameter values for device specific metrics so as to locate transactions from a common device, or at least to infer that multiple transactions occurred from the same device, and to then determine whether such transactions are related to each other in a relevant manner, such as transactions that involve responding to an advertisement and a corresponding transaction to purchase an item advertised in the advertisement.

As one example, and as discussed in more detail below, the conversion identifier 218 may sort the transaction logs 214 in order of increasing (or decreasing) skew or other device identifying derived metric, and may then sequentially evaluate the ordered entries looking for matching transactions, where the skew values between the particular entries is small enough to suggest that the entries involve the same device. In making such a determination of whether particular entries involve the same device, other fields of the transaction logs 214 may also be taken into account. Where a match in skew or other relevant metric is identified, and a transaction match is also identified, the occurrence of the transaction, such as a response to an advertisement followed by a conversion to purchase the product advertised, may be identified and saved.

Such saved occurrence data may then be provided to a reporting tool 220 which may pass such information in various ways onto other components in the system 200. For example, the information may be passed to the advertising server system 206, and may be provided in a report to the company that ran the advertisement and provided the content for sale. Such a report may indicate the frequency with which displaying the advertisement resulted in user interaction with the advertisement, and further results in conversions by means of purchasing of a product because of the advertisement. Such a report may also indicate the amount of a lapsed time or average elapsed time between the display of advertisement or advertisements and conversions for those advertisements, and may show information for related products and advertisements, so that the advertiser may determine whether there is a synergistic effect in such situations. For example, where a software developer has a number of similar games at the application marketplace, and runs advertisements for a first of those games, a report may indicate to the advertiser that others of the games are being purchased by people who have seen the advertisements for the first game. For example, a user may see an advertisement, click on it, be taken to a page for the developer in an application marketplace, and may see other games in which he or she may be interested, and may purchase those other games. Such information may be valuable to a developer, in that the developer may want to cross market the various games in a more aggressive manner than the developer has been doing in the past.

Billing decisions may also be made based on information received from the reporting tool 220. For example, if the advertiser discussed here has agreed to pay a certain amount for conversions resulting from advertisement impressions or interactions, the advertiser's account may be debited a certain value each time the data indicates that a user has performed a conversion after viewing an advertisement. Although the conversion determination here is made inferentially rather than directly, where the confidence level for such conversions is sufficiently high, an advertiser may simply assume that, in general, the data from the system 200 accurately reflects the number of conversions. Alternatively, the number of conversions reported by the system 200 may be reduced by a slight amount to represent the degree of uncertainty in such a system.

Figure 3A:
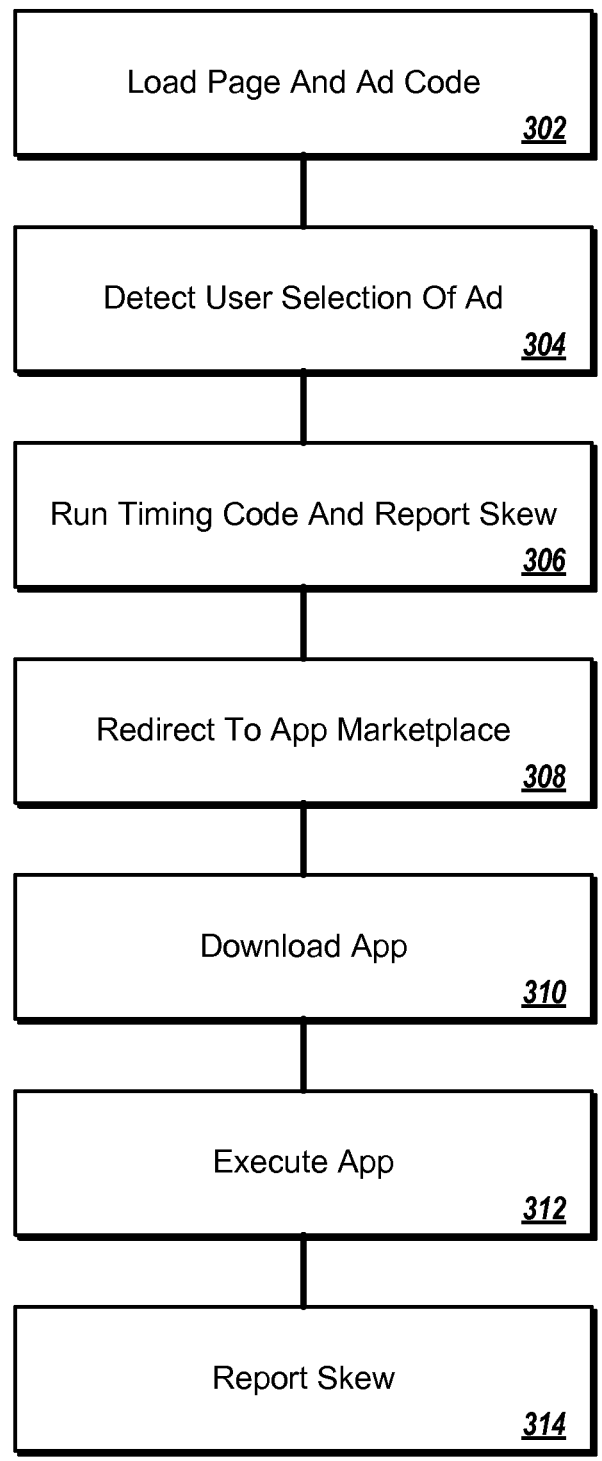
FIG. 3A is a flow chart of an example process for tracking conversions for applications.

FIG. 3A is a flow chart of an example process for tracking conversions for applications. In general, the process is shown from the viewpoint of a client device in the form of a smartphone, and involves interaction of the device with a user, and corresponding interaction of the device with one or more server systems that are remote from the device.

The process begins at box 302, where the device loads page and advertisement code associated with a web page. For example, a user of the device may visit a web site for a newspaper and may navigate to an article about small businesses. Terms in that article may cause an advertisement to be served onto the page by an advertising network that partners with the publisher of the newspaper, where the advertisement is for software that can help entrepreneurs develop business plans via their mobile computers. The user may be intrigued by the advertisement and may click on the advertisement to obtain more information about the software product. Such clicking may bring the user immediately to a page in an application marketplace where the user can obtain information about the program and purchase it, or to a web page for the software company where the user can buy and download the program or can selected an on-screen control to then be taken to the application marketplace (e.g., after the user has performed research on the program by reviewing the advertiser's web pages).

The clicking can be detected (box 304) and the process may cause timing code that is associated with the advertisement to be run so that clock skew for the device can be computed (box 306). As discussed above, such a process may involve the device sending a ping to a clock server, receiving a time back from the server, and computing a skew between the time on the device and the time on the server (ignoring time zone differences typically). The device may then send the computed skew and other metadata to a tracking server system.

The skew computation may be performed a plurality of times, and an average skew may be reported as the skew for the device. Such averaging may help to remove ping-to-ping differences in the round trip profile for a communication (and in particular, changes in the symmetry of the round trip profile), and thus to reduce the number of false negatives when comparisons are made between such reports in an effort to identify when a single device has delivered two reports, such as is discussed below with respect to FIG. 3B.

Also in response to the clicking (box 304), the operation of redirecting the user to the requested website, such as a website for an application marketplace, can occur (box 308). Such redirection can occur after the timing code has been run and the clock skew has been determined in box 306, or during the time that the timing code is running and/or the clock skew is being determined.

At box 310, the user downloads the application to their device after interacting with the application marketplace, or with another target of the advertisement, after a period of time. For example, the user may have reviewed a description and screen shots of the application, may have checked other sites for reviews and ratings of the application, and may even have tried a demo of the application, before purchasing and downloading it. The download may occur in any of a variety of well-known manners, and may depend upon functionality that is provided by an operating system for the device.

Upon downloading the application, the user executes the application at box 312. Such execution may trigger certain code that is executed only when a user initially starts using an app, such as registration code and, in this case, reporting code for reporting to a central server system the skew of the device on which the application has been installed (box 314). Such skew data can be reported with the code being blind to whether the user obtained the application after viewing an advertisement or in some other manner, and instances that are not connected to an advertising impression may be ignored by the central server system when it conducts its analysis.

Generally, the time lapse between the user clicking on the advertisement and the user executing the application will be small, as the clock skew will not have changed during that elapsed time. Indeed, if a great amount of time does elapse (with accompanying greater clock skew), it may be safe to assume that the user's ultimate purchase of the application was not primarily motivated by the user's seeing the advertisement, and thus it would be improper to classify the purchase as being a conversion resulting from the advertisement impression or interaction. In this manner, the use of skew may be able to inherently distinguish purchases or other user actions using a device that were motivated by an advertisement, from those that were not.

Other device-specific factors other than, or in addition to, clock skew, could be used in similar manners. For example, current device bandwidth could be measured and reported to a tracking server system. Such measurements may vary more, but could provide a sufficient indication so as to be able to identify two records as coming from the same device.

By this process then, two separate applications on a computing device may make a computation about a device-specific metric that can be used to uniquely identify the computing device. They may report the results of their computations to a central server system, and if they carried out the computations in matching ways, the results of the computations can be used by the central server system to infer that the computations both occurred on the same device. Also, if the reporting by the applications is associated with a common topic, such as a particular piece of on-line content, then a determination can be made that one of the user's interactions with that topic is related to another—such as by concluding that a user's viewing of an advertisement is related to a user purchase of a product that was the subject of the advertisement.

Figure 3B:
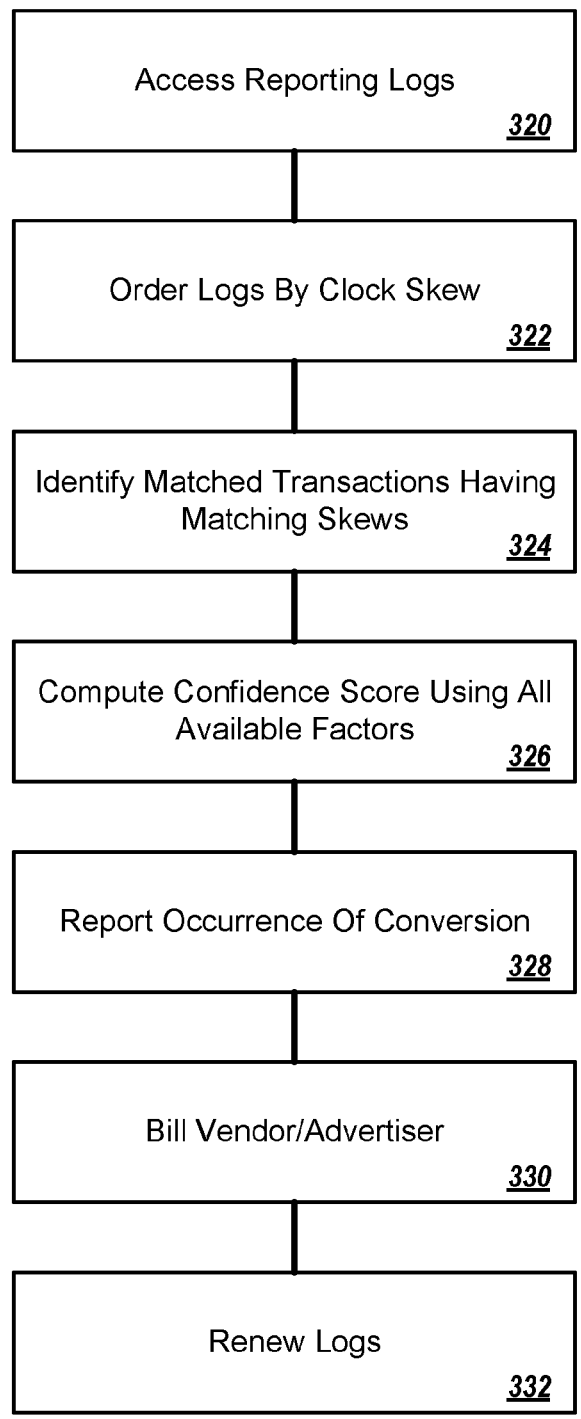
FIG. 3B is a flow chart of a process for identifying conversion events in logs of transaction data.

FIG. 3B is a flow chart of a process for identifying conversion events in logs of transaction data. In general, the process centers around actions that may be taken by a server system after a number of reports are collected, like those discussed in FIG. 3A. The processing of such reports may involve identifying skew-matched results, and then determining if those results are topic-matched, in that, for example, two different reports relate to the same on-line content product such as a software application.

The example process begins at box 320, where reporting logs are accessed. The logs may be stored in a database that includes, as records, reports that have been provided by various remote computing devices, such as in the manners discussed above. At box 322, the logs are ordered based on the amount of clock skew reported by the devices. In certain instances, a log may store many sorts of information about devices, and certain reports may not have anything to do with clock skew. Such reports may thus be filtered out of the process initially, or a data set may be established using only the records that report clock skews. The subsequent ordering of the records based on clock skew can occur in a variety of manners, and the particular technique used for the sorting is not important here.

At box 324, matched transactions that have matching skews are identified. The order of identifying matches is not critical. In one example, using skew-sorted records, groups of transactions that have clock skews that differ by a threshold amount of time (e.g., a range of picoseconds, a range of microseconds, a range of milliseconds) or less can be analyzed to identify matching transactions. The threshold amount of time that is used to bound a group of reports from which matching transactions can be identified may be selected so as to take into account slight changes in clock operation that may occur between a client device and a clock server during the limited time period between the user clicking on an ad and the user purchasing an item that is covered by the advertisement. The threshold amount of time may also be selected to be large enough to account for asymmetries that may occur in the round-trip time for acquiring clock times from a server, so that such natural changes do not create false positives or negatives. Groups of records with clock skews that differ by a threshold amount of time or less can be compared to determine whether any entries that are currently within the group of records under consideration relate to the same on-line item—such as by one entry indicating a user selection of an ad for a particular software application, and the other representing execution of the same software application on the user's device after they purchase the application. Such a double match, such as where the clock skew matches and the subject of the operations matches, may indicate concerted activity at two points in time by a single computer user.

In certain implementations, it may be advisable to look to other factors to confirm whether a match should be indicated by the process. For example, the IP address for the reports, identifiers for the particular types of devices, settings on the devices (e.g., language, wireless communication mode, etc.), and other information about the devices may be used to supplement the analysis. Such supplementation may be especially helpful where the data is dense, e.g., where there are many log entries within the skew window. The data is likely to be densest at low skew values, since devices can be expected to resynchronize periodically, so that devices will start with very little or no skew, and then the level of skew will slowly and naturally increase until there is another synchronization. Thus, additional factors may be blended in at low skew levels and blended out at higher skew levels.

At box 326, the process may optionally compute a confidence score for a decision that two records are related to each other. The confidence score may be generated in a variety of manners that allow each input to have an appropriate weight. The score can then be used in a variety of ways, such as to discount an amount that an advertiser is charged as the confidence score falls (including discounts up to 100% where the confidence score is at or below a threshold value).

At box 328, the process reports the occurrence of the conversion. Such reporting may occur by alerting an advertising system and by providing that system with data it needs to analyze the conversion, such as an ID for the ad and an ID for the product. As a result, the advertising system can charge the advertiser for the conversion (box 330), and can also generate a variety of reports for the advertiser using the information.

Finally, at box 332, the logs are renewed. For example, as soon as determination has been made about conversions for a particular time period, the related entries for that period may be removed from the log. Such action may help maintain privacy for any such transactions.

Thus, by this process, data that has been reported from applications on various remote computing devices can be efficiently analyzed, and determinations may be made about how certain entries in the data are related to each other. Those determinations may then be converted into actions such as the reporting to advertisers for conversions that are inferred to have occurred in response to people watching the advertisers' advertisements.

Figure 4:
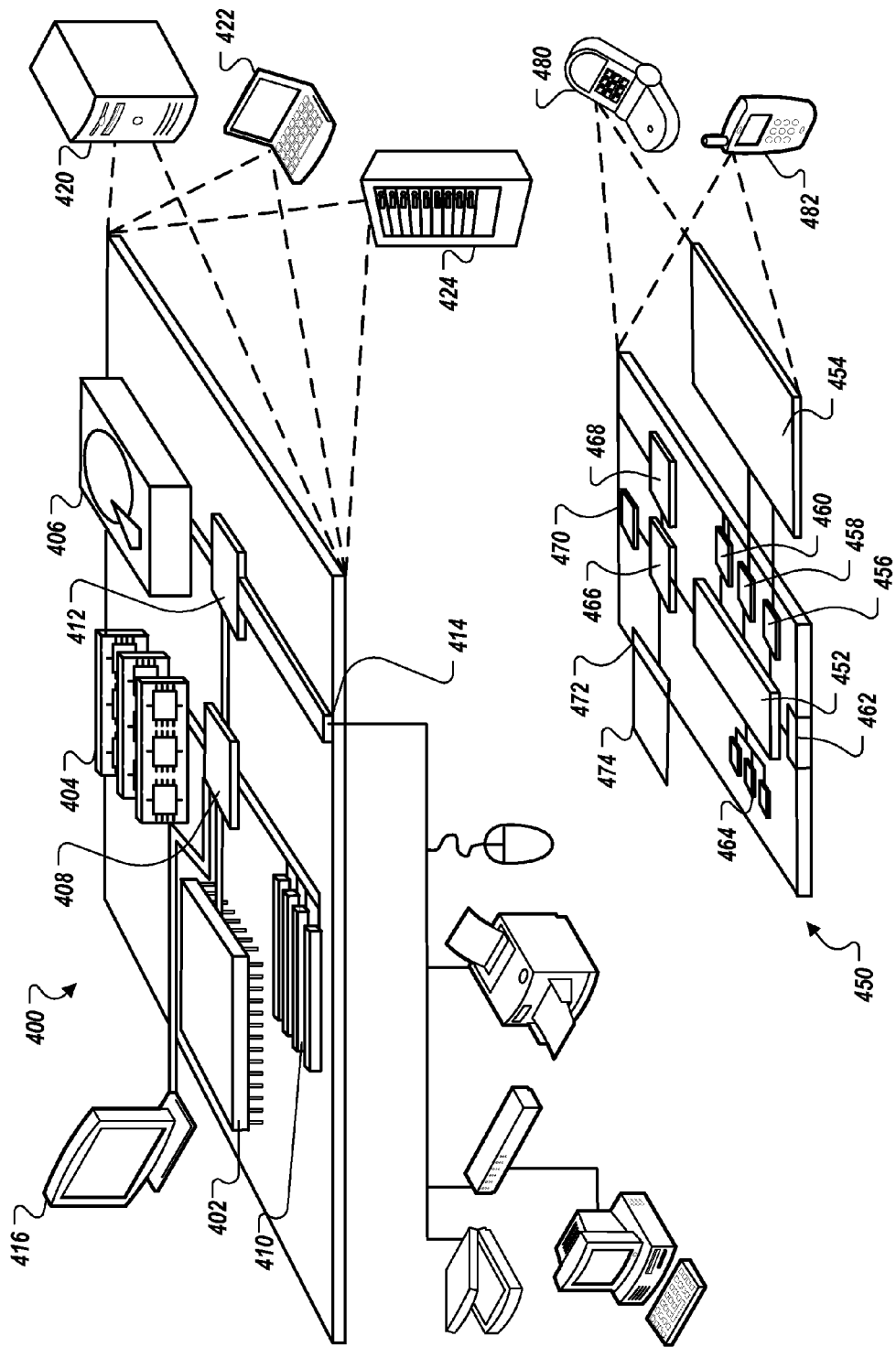
FIG. 4 is a block diagram of computing devices that may be used to implement the systems and methods described in this document, as either a client or as a server or plurality of servers.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, tablets and other similar computing devices. Additionally, computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be embodied in a tangible information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the FIG. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 452 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a secure manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in FIG. 4. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, advantageous results may be achieved if the steps of the disclosed techniques were performed in a different sequence, if components in the disclosed systems were combined in a different manner, or if the components were replaced or supplemented by other components. Accordingly, other embodiments are within the scope of the following claims.

What is claimed is:

1. A computer-implemented method for identifying an online advertising conversion, the method comprising:

receiving, by one or more computers, a first set of data specifying that a user interacted with an online advertisement and specifying a first clock skew between a clock of a client device at which the user interaction occurred and a clock server that differs from the one or more computers, wherein the first clock skew is determined based on a difference between (i) a midpoint between a current time on the client device when the client device sent a time request to the clock server in response to detecting the user interaction occurred and a current time on the client device when the client device received a response to the time request from the clock server and (ii) a time specified in a response to the time request by the clock server, wherein the specified time corresponds to a time when the clock server received the time request from the client device;

receiving, by the one or more computers, a second set of data specifying that an application was installed and specifying a second clock skew between a clock of a client device at which the application was installed and the clock server, wherein the second clock skew is determined based on a difference between (i) a midpoint between a current time on the client device when the client device sent a time request to the clock server in response to detecting the application was installed and a current time on the client device when the client device received a response to the time request from the clock server and (ii) a time specified in a response to the time request by the clock server, wherein the specified time corresponds to a time when the clock server received the time request from the client device;

determining, by the one or more computers and based on a difference between the first clock skew and the second clock skew being less than a specified amount, that the application installation is attributable to presentation of the online advertisement; and outputting, by the one or more computers and based on the determination that the application installation is attributable to presentation of the online advertisement, an indication that the online advertisement led to a conversion.

2. The method of claim 1, further comprising serving, by the one or more computers, code for the online advertisement to a computing device, wherein the code causes a clock skew for the computing device to be determined in response to user interaction with the online advertisement.

3. The method of claim 2, further comprising storing information identifying the online advertisement and at least one of the first clock skew or the second clock for the computing device in a reporting log.

4. The method of claim 1, wherein determining that the application installation is attributable to presentation of the online advertisement comprises determining that the first clock skew and the second clock skew were both received within a threshold amount of time or less.

5. The method of claim 1, wherein determining that the application installation is attributable to presentation of the online advertisement comprises determining whether additional information received in each of the first set of data and the second set of data match within a threshold variance.

6. The method of claim 5, wherein the additional information comprises one or more environmental indicators that indicate a physical environment within which a client device was located when the first set of data or the second set of data was provided.

7. The method of claim 6, wherein the environmental indicators include one or more of: sound, temperature, and location information that indicates a geographic location.

8. The method of claim 5, wherein the additional information comprises one or more pieces of information selected from the group consisting of an IP address, information identifying a model of a computing device, information identifying an operating system, and a version of an operating system of a computing device.

9. A computer-implemented system for identifying on-line advertising conversion, the system comprising:
an advertising sub-system arranged to serve interactive advertisements to users of computing devices;
one or more transaction logs that store transaction instance data representing interactions by computer users with the advertisements and with products that are subjects of the advertisements; and
a conversion correlator programmed to correlate connections between interactions with advertisements with interactions with products that are subjects of the advertisements by matching clock skew data for the computing devices, wherein the conversion correlator includes one or more processors that execute instructions that cause the conversion correlator to perform operations comprising:
receiving a first set of data specifying that a user interacted with an online advertisement and specifying a first clock skew between a clock of a client device at which the user interaction occurred and a clock server that differs from the one or more computers, wherein the first clock skew is determined based on a difference between (i) a midpoint between a current time on the client device when the client device sent a time request to the clock server in response to detecting the user interaction occurred and a current time on the client device when the client device received a response to the time request from the clock server and (ii) a time specified in a response to the time request by the clock server, wherein the specified time corresponds to a time when the clock server received the time request from the client device;
receiving a second set of data specifying that an application was installed and specifying a second clock skew between a clock of a client device at which the application was installed and the clock server, wherein the second clock skew is determined based on a difference between (i) a midpoint between a current time on the client device when the client device sent a time request to the clock server in response to detecting the application was installed and a current time on the client device when the client device received a response to the time request from the clock server and (ii) a time specified in a response to the time request by the clock server, wherein the specified time corresponds to a time when the clock server received the time request from the client device;
determining, by the one or more computers and based on a difference between the first clock skew and the second clock skew being less than a specified amount, that the application installation is attributable to presentation of the online advertisement; and
outputting, by the one or more computers and based on the determination that the application installation is attributable to presentation of the online advertisement, an indication that the online advertisement led to a conversion.

10. The system of claim 9, wherein the interactive advertisements are served with code that cause a clock skew to be determined by a device on which an advertisement has been displayed in response to user interaction with the online advertisement.

11. The system of claim 9, further comprising an application marketplace offering one or more applications for sale that, when installed on a computing device, cause a clock skew for the computing device on which the application is installed to be determined and reported to the one or more transaction logs.

12. The system of claim 9, further comprising a transaction log manager programmed to remove entries from the logs after the conversion correlator has analyzed the entries.

13. A computer-implemented method comprising:
receiving, by a computing device, input indicating that a user has interacted with an advertisement displayed by the computing device;
in response to receiving the input, executing, by the computing device, instructions included in the advertisement that cause the computing device to perform operations comprising:
determining a first clock skew for the computing device relative to a clock server at a first time, wherein the first clock skew is determined based on a difference between (i) a midpoint between a current time on the client device when the client device sent a time request to the clock server in response to detecting the user interaction occurred and a current time on the client device when the client device received a response to the time request from the clock server and (ii) a time specified in a response to the time request by the clock server, wherein the specified time corresponds to a time when the clock server received the time request from the client device; and
providing the first clock skew to one or more other computing devices; and
executing, by the computing device, code associated with an application installed on the computing device, wherein execution of the code causes the computing device to perform operations comprising:
determining a second clock skew for the computing device relative to the clock server at a second time corresponding to installation of the application, wherein the second clock skew is determined based on a difference between (i) a midpoint between a current time on the client device when the client device sent a time request to the clock server in response to detecting the application was installed and a current time on the client device when the client device received a response to the time request from the clock server and (ii) a time specified in a response to the time request by the clock server, wherein the specified time corresponds to a time when the clock server received the time request from the client device; and
providing the second clock skew to the one or more other computing devices, wherein the one or more other computing devices determine whether the application installation is attributable to presentation of the advertisement based, at least in part, on the first clock skew and the second clock skew.

14. The computer-implemented method of claim 13, wherein first additional information associated with the computing device at the first time is provided with the first clock skew and second additional information associated with the computing device at the second time is provided with the second clock skew; and wherein the first additional information and the second additional information are additionally used to verify that that selection of the advertisement and purchase of content was performed by the computing device.

\* \* \* \* \*